United States Patent [19]

Mariani et al.

[11] Patent Number: 5,418,730
[45] Date of Patent: May 23, 1995

[54] CONTROL AXIS MOUNTED COMPUTER INTERFACE FOR COORDINATE MEASURING MACHINES

[75] Inventors: Michael A. Mariani, North Kingstown; Kenneth L. Sheehan, Saunderstown, both of R.I.

[73] Assignee: Brown & Sharp Manufacturing Company, North Kingstown, R.I.

[21] Appl. No.: 48,765

[22] Filed: Apr. 16, 1993

[51] Int. Cl.⁶ ............................................. G01B 7/00
[52] U.S. Cl. .................... 364/474.22; 33/505
[58] Field of Search .............. 364/560, 188, 474.22, 364/474.37; 395/99; 33/556, 558, 504, 505

[56] References Cited

U.S. PATENT DOCUMENTS

| | | |
|---|---|---|
| 3,835,464 | 9/1974 | Rider . |
| 4,097,996 | 7/1978 | Yamazawa et al. . |
| 4,130,941 | 12/1978 | Amsbury . |
| 4,352,246 | 10/1982 | Hauert . |
| 4,493,992 | 1/1985 | Geller . |
| 4,543,571 | 9/1985 | Bilbrey et al. . |
| 4,550,316 | 10/1985 | Whetstone et al. . |
| 4,780,963 | 11/1988 | McMurtry . |
| 4,786,892 | 11/1988 | Kubo et al. . |
| 4,795,952 | 1/1989 | Brandstetter ........................ 318/560 |
| 4,888,877 | 12/1989 | Enderle et al. . |
| 4,939,503 | 7/1990 | Lawrence et al. . |
| 4,952,919 | 8/1990 | Nippoldt . |
| 5,084,981 | 2/1992 | McMurtry et al. . |
| 5,131,166 | 7/1992 | Weber . |
| 5,208,736 | 5/1993 | Crooks et al. ........................ 361/393 |

OTHER PUBLICATIONS

SupraNews, "System 6—Over Fifty on the Job", Apr./May 1992.

*Primary Examiner*—Emanuel T. Voeltz
*Assistant Examiner*—Edward Pipala
*Attorney, Agent, or Firm*—Wolf, Greenfield & Sacks

[57] ABSTRACT

A computer interface device for a coordinate measuring machine comprises a trackball that transmits perpendicular movement signals to a computer in response to corresponding perpendicular tangential movement of the trackball. The computer is interconnected with the coordinate measuring machine and normally receives measurement data corresponding to a location of a probe on the computer. The trackball is located adjacent the probe so that a user grasping the probe can manipulate the trackball to transmit data manipulation signals to the computer. Typically, the trackball moves a cursor about the computer screen. A plurality of data entry buttons are included on the interface device and enable the user to execute computer procedures selected by the cursor.

26 Claims, 9 Drawing Sheets

*MEASUREMENT SOFTWARE PSEUDO CODE*

- INITIALIZE SYSTEM —— 200
- PUT UP THE MAIN MENU —— 202

FIG. 6

- MAIN LOOP —— 204

CALL CHECK_FOR_KEYBOARD_INPUT —— 206
        IF KEYBOARD INPUT THEN
            CALL PROCESS_KEYBOARD_INPUT —— 210

CALL CHECK_FOR_MICROVAL_XYZ_INPUT —— 214
        IF MICROVAL XYZ INPUT THEN
            CALL PROCESS_MICROVAL_XYZ_INPUT —— 218

CALL CHECK_FOR_TRACKBALL_INPUT —— 224
        IF TRACKBALL INPUT THEN
            CALL PROCESS_TRACKBALL_INPUT —— 228

(THIS CODE IS NOT USED IF A MOUSE IS PRESENT)
    CALL CHECK_FOR_LIGHTPEN_INPUT
        IF LIGHTPEN INPUT THEN
            CALL PROCESS_LIGHTPEN INPUT

END LOOP IF EXIT —— 242

CHECK_FOR_KEYBOARD_INPUT —— 208
    CHECK DOS KEYBOARD BUFFER FOR INPUT
        IF KEYBOARD INPUT THEN
            READ KEYBOARD_CODE FROM DOS
            INDICATE KEYBOARD INPUT RECEIVED PROCESS_KEYBOARD_INPUT —— 212
    CASE OF KEYBOARD_CODE
        ESCAPE KEY: CALL ESCAPE KEY PROCESSING
        ETC.

CHECK_FOR_MICROVAL_INPUT —— 216

PROCESS_MICROVAL_INPUT —— 220

CHECK_FOR_TRACKBALL_INPUT —— 222
    POLL RS232 COM PORT FOR MOUSE DATA
    IF TRACKBALL DATA RECEIVED THEN
        PUT 3-BYTE TRACKBALL DATA IN MOUSE BUFFER
        INDICATE TRACKBALL INPUT RECEIVED PROCESS_TRACKBALL_INPUT —— 226
    DECODE TRACKBALL XY POSITION
    IF TRACKBALL XY POSITION HAS CHANGED THEN
        ERASE TRACKBALL CURSOR FROM CURRENT POSITION
        DRAW TRACKBALL CURSOR AT NEW POSITION
        SET LIGHTPEN ROW, COLUMN TO MOUSE XY POSITION —— 230
        INDICATE LIGHT PEN INPUT RECEIVED     IF TRACKBALL POINT BUTTON PRESSED THEN
        SET LIGHTPEN SWITCH CLOSURE TO TRUE —— 232
        INDICATE LIGHTPEN INPUT RECEIVED     ELSE
        SET LIGHTPEN SWITCH CLOSURE TO FALSE —— 234

IF TRACKBALL ESCAPE BUTTON PRESSED THEN
        PUSH ESCAPE KEY ON DOS KEYBOARD BUFFER —— 236

CONTROL AXIS MOUNTED COMPUTER INTERFACE FOR COORDINATE MEASURING MACHINES

FIELD OF THE INVENTION

The present invention relates generally to a control axis mounted computer interface for coordinate measuring machines, and more particularly to a trackball interface device located adjacent a measuring probe on the control axis.

BACKGROUND OF THE INVENTION

Coordinate measuring machines operating in three axes of movement in conjunction with a microcomputer are commonly utilized to process measurement and dimensional data on components. Typically, such measuring machines include a rigid table comprising, for example, granite, upon which a workpiece is positioned. A moving bridge mounted on rails over the table supports a carriage having a rail that moves toward and away from the workpiece. The bridge moves across the table on the ways in one linear axis (the "X-axis") while the carriage moves perpendicularly to the X-axis along the bridge (the "Y-axis"). The carriage's control axis, the Z-axis, consequently, moves perpendicularly to the X- and Y-axes along the "Z-axis". "Control axis" is defined as the axis which the operator uses to control the motion of a coordinate measuring system when used manually. In the embodiment disclosed herein, this would be the Z-axis.

In operation, the moving components of the coordinate measuring machine are supported on their respective bearing surfaces that substantially minimize friction, thus allowing a user to move the lower end of the Z-axis or control axis in three dimensions by grasping the end and gently translating it in the desired direction. In this manner, a probe located at the end of the rail in a probe holder can be positioned at different points along the measuring piece. The probe can include an electronic or manual trigger that generates a signal each time the probe touches the surface of the workpiece.

The coordinate measuring machine is typically interfaced with a microcomputer or similar information storage and processing device. As the user moves the probe across the workpiece, triggering point signals, the computer records the relative spatial position of the probe, This information is typically obtained by determining the position of the bridge, the carriage and the Z-axis with respect to each of the machine's X, Y and Z bearing surfaces.

The measuring process described above is often slowed by the user's interaction between the probe and the computer. For example, most measuring routines require the user to select, by means of a keyboard, light pen or other computer interface, a particular measuring operation to be performed and a particular geometric shape to be measured by that operation. To select the operation, the user must interact directly with the computer terminal while, usually, taking his or her hands off of the probe holder. Following selection, the user then returns to the probe holder and performs the measuring operation on the workpiece. Subsequent to obtaining a particular group of points or "measuring block", the user then typically returns to the computer terminal to process the measuring block. Such processing can include entry of the points, cancellation of the points, re-entering of certain points, comparison of the points to known values and/or application of tolerance ranges to the points. Subsequent to processing of the measuring block, the user then selects another measuring operation, such as a further measurement on the same workpiece, and repeats the measuring process by moving the probe accordingly.

The user's continual shift from the measuring machine, to the computer terminal, and back, substantially increases the overall time devoted to measuring a workpiece. One attempt to reduce user interaction time resulting from the need to shift between the measurement device and the computer terminal is embodied in the System 6 TM by Romer of Montoire, France. The System 6 TM is an articulated arm measuring device having two elongated hinge members at the base of the unit and a shorter hinge member with a wrist joint at the probe end of the unit. It is used primarily to measure large objects and moves in six degrees of freedom (6 axes). The System 6 TM includes a switch that allows the user to change between measuring mode and computer data entry mode. As such, when the data entry mode is activated, the wrist and end hinge become, essentially, joystick controllers that generate data signals to allow a cursor to be manipulated on the computer screen. The user usually backs the probe away from the workpiece so he or she has ample room to manipulate the arm in its "joystick" capacity. Once data entry is accomplished, the user switches back to measurement mode, returns the probe to the workpiece and continues his or her measurements. The ease with which the articulated arm can be moved out of interferring contact with a workpiece, and the overall scale of the device make such multi-tasking of arm joints practical. However, such a device would be unsuitable for a three-axis measuring machine.

In view of the disadvantages of the prior art, it is an object of this invention to provide a computer interface device that allows the user to maintain control of the measuring machine probe while operating the computer. The interface should not interfere with conventional operation of the measuring machine and should be readily adaptable to existing measuring machines, computers and overall systems.

SUMMARY OF THE INVENTION

This invention provides a control axis mounted computer interface device that enables the user to maintain a hold on the control axis of the measuring machine while simultaneously manipulating information on a screen of a computer that receives and processes probe location data from the machine. According to a preferred embodiment of this invention, the probe holder, at the lowermost end of the Z-axis, includes a trackball device having perpendicularly oriented sensors that transmit signals derived from rotation of the trackball in each of two corresponding perpendicular tangential directions of movement. The interface device further comprises data entry buttons in proximity to the trackball. The interface device, according to this embodiment, is connected to a computer port normally reserved for light pen, mouse, touch screen or other data entry device.

In operation, the user manipulates the control axis of the machine to manipulate the machine's probe to perform a measuring operation. During the measurement operation, the user manipulates the interface device to move a cursor about the computer screen to select predetermined measurement procedures from a variety of menus displayed on the computer screen. The user utilizes the data entry buttons to execute his or her selected procedures.

By locating the interface device on the control axis, the user need not generally remove his or her hold on the machine probe while performing a measurement procedure. So long as the computer screen remains within view of the user, he or she may continue to perform operations on a workpiece while manipulating data with the interface device as necessary.

BRIEF DESCRIPTION OF THE DRAWINGS

The objects, advantages and features of the invention will become more clearly appreciated from the following detailed description when taken in conjunction with the drawings in which:

FIG. 6 is a pseudo code listing of a measurement procedure utilizing a computer interface according to this invention.

DETAILED DESCRIPTION

Figure 1:
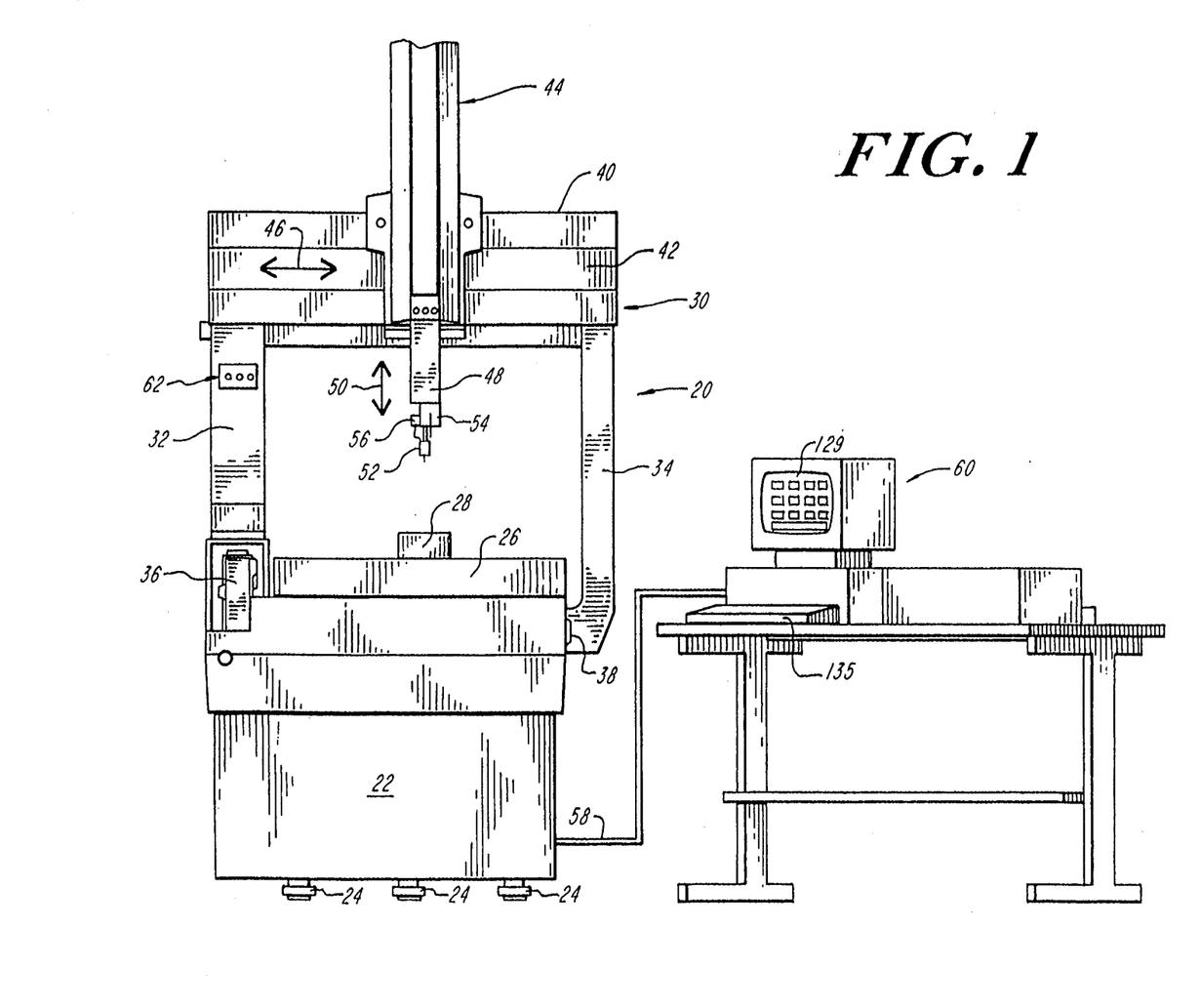
FIG. 1 is a somewhat schematic view of a coordinate measuring machine system including a computer interface device according to this invention.

A coordinate measuring machine with an interconnected computer is illustrated in FIG. 1. The coordinate measuring machine 20 is of conventional design and includes a base 22 having shock absorbing supports 24 and a rigid table 26. Table 26 comprises granite or another suitably hard and rigid surface. The granite table supports a workpiece 28 shown schematically. Machine 20 includes a bridge 30 having upright supports 32 and 34. The upright supports ride on respective ways 36 and 38 and enable horizontal cross beam 40 of bridge 30 to traverse base 26 in a direction aligned into and out of the page of FIG. 1. Cross beam 40 itself comprises a way 42 along which moves a Z-axis carriage 44 in the direction of arrow 46. Typically, movement along the direction 46 comprises "Y-axis" movement, while movement along ways 38 and 40 of the bridge comprises X-axis movement.

Carriage 44 supports a movable beam or control axis (Z-axis) 48 that translates along the direction of arrow 50 relative to carriage 44. The lowermost end of Z-axis 48 includes a probe 52 and a probe holder 54. These elements are detailed further below. According to this invention, probe holder 54 includes a computer interface device 56, comprising a trackball-style control roller and data entry switches according to this invention. Trackball interface device 56 is interconnected by means of a data line (not shown) that passes through the interior of bridge 30 and machine 20, and exits machine 20 via cable 58 that is interconnected with a computer 60. Computer 60 comprises a microcomputer according to this embodiment, but as defined herein, any data processing and storage device, including a device interconnected with another machine tool, is contemplated as being termed a "computer". The structure and operation of interface 56 in connection with computer 60 is described further below.

Bridge 30 is supported on ways 36 and 38 via air bearings according to this embodiment. The air bearings are of substantially conventional design and are not shown. Similar air bearings are positioned between carriage 44 and way 42 and also between Z-axis 48 and carriage 44. The air bearings for each axis, according to this embodiment, are controlled by respective switches 62 mounted on upright support 32 of bridge 30. Air for the bearings flows continuously over respective bearing surfaces (e.g. the ways), and is provided by a compressor (not shown). The air bearings enable a substantially friction-free movement in each of the X-, Y- and Z-axes.

As noted above, in operation, a user typically grasps Z-axis 48 proximate probe holder 54 to pass probe 52 around workpiece 28. Probe 52 is brought by the user into contact with the workpiece at various points thereabout. Data points are downloaded into the computer via cable 58 as the probe is moved along workpiece 28. The loaded data points are used to generate measurement values in computer 60. Typically, each bearing surface of bridge 30 includes transducers or other position-to-data translation devices that generate discrete values as various elements of bridge 30 are moved to corresponding discrete locations by the user. These values form the location points that the computer receives.

Figure 2:
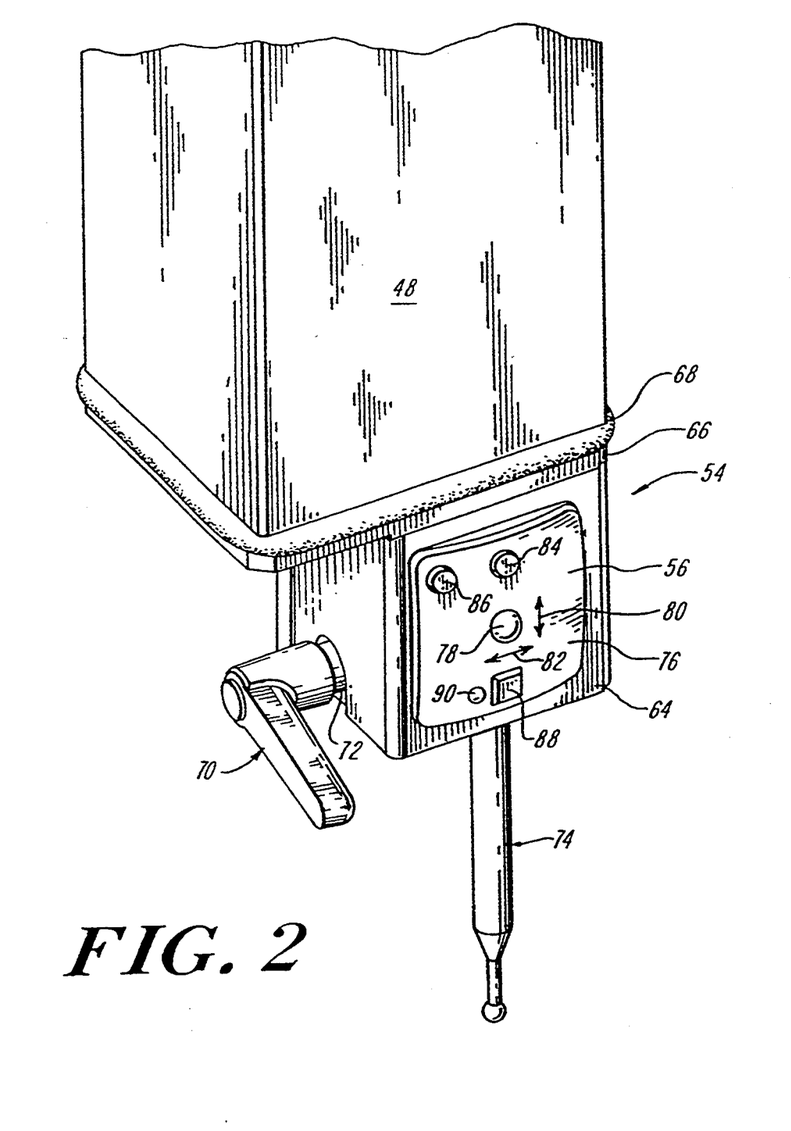
FIG. 2 is a more detailed fragmentary perspective view of the control axis carriage and probe holder of the coordinate measuring machine of FIG. 1 including the computer interface device according to this invention.
Figure 3:
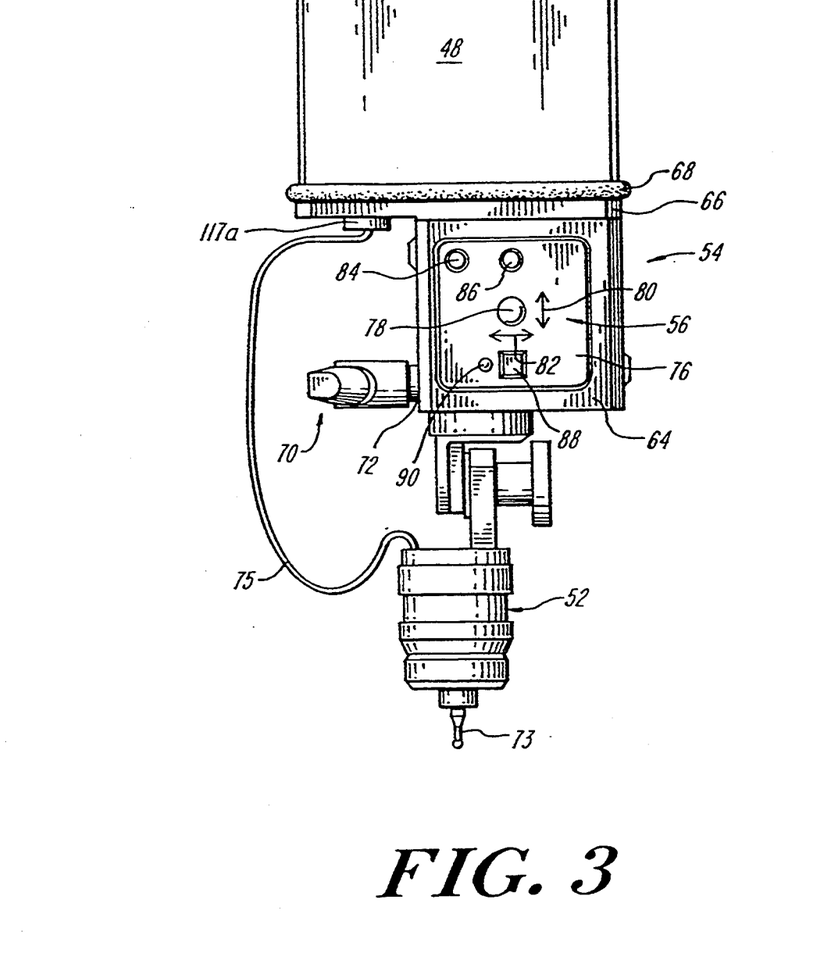
FIG. 3 is a side elevation view of the control axis carriage, probe holder and computer interface device of FIG. 1 and 2.

FIGS. 2 and 3 further illustrate the lowermost end of Z-axis 48 including probe holder 54 carrying different probes according to this invention. Probe holder 54 comprises a substantially rigid box-like housing 64 constructed from sheet steel or similar material. Housing 64 is attached to a mounting plate 66 that is, itself, secured to Z-axis 48. An elastomeric gasket 68 comprising, according to this embodiment, polyurethane 0-ring material is located between plate 66 and Z-axis 48. Gasket 68 serves primarily as a dust seal between plate 66 and Z-axis 48. Housing 64 further includes a side mounted lever 70 having an axle 72 that passes into housing 64. Axle 72 acts as a lock to removably secure a probe into housing 64. A substantially conventional electronic touch trigger probe 52, such as that illustrated in FIG. 1, is depicted in more detail in FIG. 3. As described further below, touch trigger probe 52 sends an electrical signal when movable probe end 73 engages a workpiece. The probe signal is transmitted through wire 75 to base 66 and then to computer 60 via cable 58 (FIG. 1).

A standard "hard" probe 74 without trigger switch is illustrated in FIG. 2. Probe holder 54 according to this embodiment is contemplated as receiving a variety of probes based upon the user's needs. Different probes each include a cylindrical stem received by an orifice in the base of housing 64 (refer, for example, to stem 94 in FIG. 4). Axle 72 is rotated by lever 70 to lock the stem into housing 64.

Unlike conventional probe holder housings, housing 64 includes trackball computer interface device 56 according to this invention. Interface device 56 includes curved bezel 76 that projects from the surface of housing 64. Bezel 76 includes a centrally located trackball 78 that rotates freely relative to bezel 76. Track ball 78 is constructed to operate a pair of perpendicularly oriented sensors (not shown) within interface device 56 that transmit X- and Y-axis movement signals to computer 60. By rotating trackball 78 tangentially vertically in one of opposite directions, substantially along direction of double arrow 80, a corresponding Y-axis input is transmitted to computer 60. Conversely, by rotating trackball 78 substantially tangentially horizontally, in one of opposite directions, along the direction of double arrow 82, an X-axis input is transmitted to computer 60. Note that the X- and Y-axis inputs of trackball 78 do not directly correspond to the X-, Y- and Z-axes of coordinate measuring machine 20. Rather, trackball 78 according to this invention controls data inputs to computer 60 using a screen cursor manipulated by trackball 78.

Computer interface device 56 further includes a pair of data entry buttons 84 and 86, the operation of which is, described further below, and that correspond to an escape function and a pointing or "done" function, respectively, according to this embodiment. Buttons 84 and 86 comprise single-pole-single-throw momentary contact switches according to this embodiment. Bezel 76 also includes an auxiliary switch 88 and an indicator lamp 90. Switch 88 can comprise a latch for continuous pointing or data entry functions according to this embodiment. Lamp 90 is adapted to indicate when the latch is activated. Again, switch 88 can comprise a single-pole-single-throw momentary contact switch with an internal data latching circuit (not shown).

Figure 4:
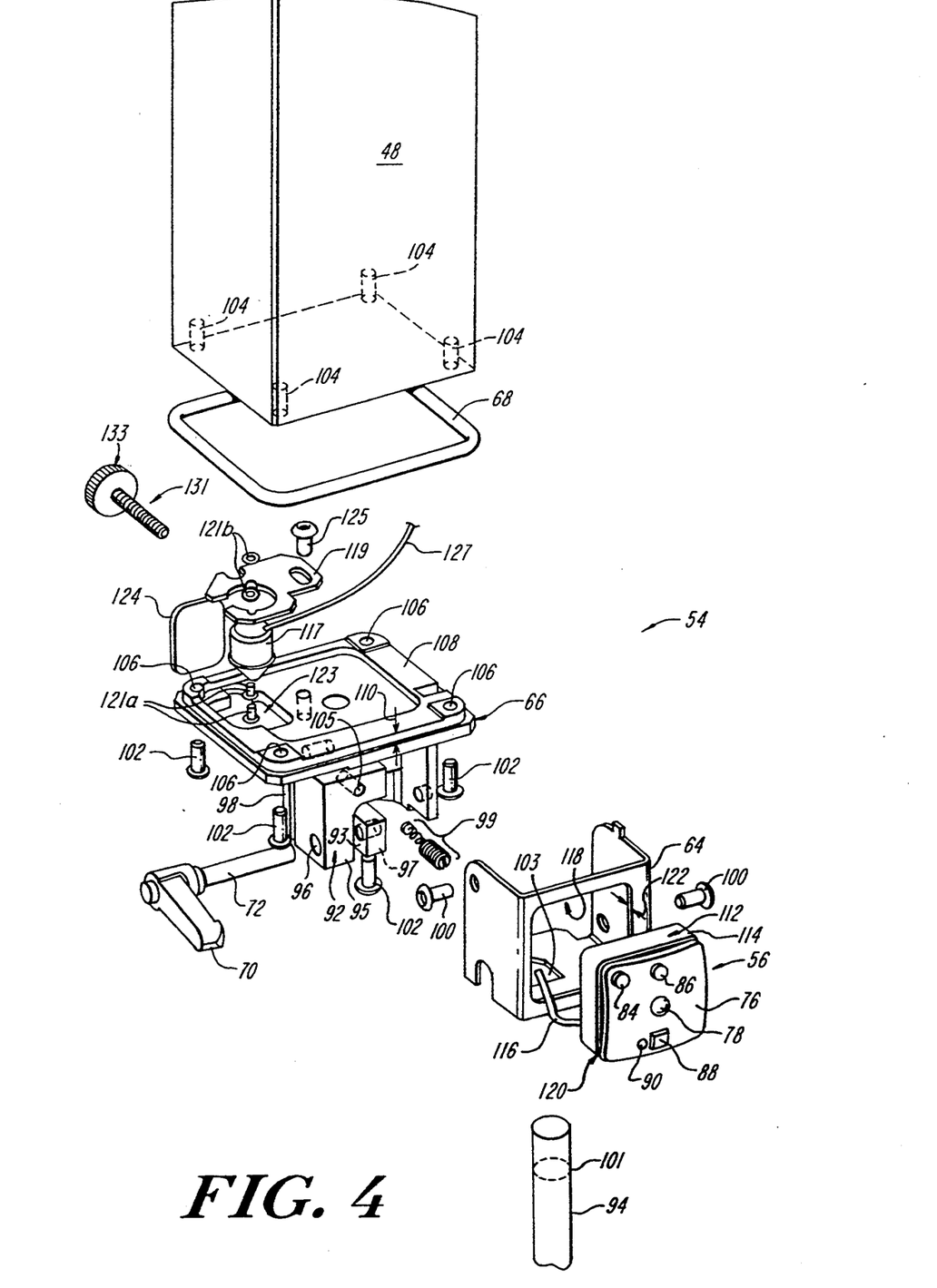
FIG. 4 is an exploded perspective view of the control axis carriage, probe holder and computer interface device FIGS. 1 and 2.

With further reference to FIG. 4, an exploded view of probe holder 54 including computer interface device 56 is illustrated. As revealed by the drawing, mounting plate 66 includes an extended base structure 92 constructed to receive the stem 94 of a probe. Structure 92 can be formed integrally with plate 66 as part of a cast or machined component. An axis hole 96 is located horizontally through structure 92 for receiving axle 72 of lever 70. A slot 93 is formed by legs 95 and 97 of base structure 92. Stem 94 is sized to slide into slot 93. Axle 72, when rotated, pulls legs 95 and 97 together to secure stem 94 firmly into base structure 92. A spring plunger assembly 99 is provided with respect to leg 95 to center and provide a snap fit for stem 94 into base structure 92. The plunger assembly 99 seats in hole 105 and bears against an optional detent 101 that can be provided on stem 94.

Structure 92 further includes a rear plate 98 that forms the rear surface of probe holder 54. The sides and front of probe holder 54 are covered by housing 64. Base 66 is secured to housing 64 by means of suitable fasteners comprising, in this embodiment, hexhead screws 100. Base 66 is also secured to Z-axis 48 using hexhead screws 102. Threaded holes 104 (shown in phantom) are provided at each of the four corners of Z-axis 48. Corresponding holes 106 without threads are located at each of the four corners of base 66. Screws 102 pass through holes 106 and are seated into axis holes 104. A shoulder 108 is provided along the upper surface of base 66. Shoulder 108 receives gasket 68 which is slightly larger in diameter than the height of shoulder 108 (as indicated by arrows 110). Accordingly, when screws 102 secure base 66 against Z-axis 48, gasket 68 is slightly compressed, forming a tight seal. Note that hole 103 in the bottom of housing 64 allows stem 94 to pass therethrough.

The housing of interface device 56 according to this embodiment is a substantially rectangular box-like housing 112 with rounded corners 114. A data cable 116 extends from device housing 112. An orifice 118 that conforms to the shape of housing 112 is cut into the front of probe holder housing 64. Device 56 thus seats with an orifice 118 with only bezel 76 exposed.

Interface device 56 can be secured into housing 64 in a variety of ways. For example, it can be cemented into place or a clamping structure can be locked onto housing 112 once it is seated in orifice 118. Alternatively, probe holder housing 64 can be sandwiched between housing 112 and bezel 76. A plurality of screws are typically provided along the rear of housing 112 (not shown). Removal of these screws allows bezel 76 to be separated from housing 112. Subsequent to separation, bezel 76 is laid over orifice 118 and housing 112 is remated with bezel 76 through the rear of probe holder housing 64. If orifice 118 is cut slightly undersize relative to housing 112 and bezel 56, the groove 120 therebetween provides a clearance for the thickness (arrows 122) of housing 64. Thus, device 56 can be secured with bezel 76 and housing 112 sandwiching probe holder housing 64.

A preferred trackball interface device according to this embodiment that enables the above-described attachment method is the Thumbelina ™ by Appoint having a length and width of approximately 1.7 inches and a height (depth) of approximately $\frac{3}{8}$ inch. Trackball 78 is compact, measuring approximately $\frac{1}{4}$ inch in diameter in this unit. Interface device data cable 116 passes through base 66 into Z-axis 48 from which it is guided out of the measuring machine to computer 60 according to this embodiment.

Probes can be electrically connected via base 66 to computer 60. A socket 117 is mounted to a bracket 119 with hexhead screws 121$a$ and nuts 121$b$. Bracket 119 is centered in a hole 123 in base 66 and is secured to base 66 by screw 125. A plug 117$a$ from the probe's cable 75 (see FIG. 3) interconnects with socket 117 to provide a removable electrical interconnection between the probe and probe holder 54. A cable 127, like interface cable 116, is guided from socket 117, through Z-axis 48, and out of machine 20 to computer 60.

As noted above, probe holder 54 acts as a grip for the user to manipulate the probe over a workpiece. To enhance gripping, a non-slip elastomeric pad 124 is provided to the rear face of base structure 98. In a typical gripping application, the user places one or more fingers, including a forefinger on pad 124 while wrapping his or her palm around a side of housing 64. The user's thumb is located proximate trackball 78 and buttons 84, 86 and 88. Hence, a firm grip can be continuously maintained upon probe holder 54 while the interface device is manipulated by the user's thumb. However, various alternative grips are contemplated such as gnurled thumbscrew 131 which can be positioned in place of pad 124 to provide a raised gripping surface 133.

In operation, it is contemplated that the user maneuvers the probe around a workpiece, and takes measurements at predetermined points. When using a touch trigger probe such as probe 52, shown in FIG. 3, points are automatically entered into computer 60 by a switching action of probe end 73 as it contacts the workpiece. Alternatively, points must be indicated manually by the user when using a non-trigger hard probe 74 such as that shown in FIG. 2. Hard probe 74 is brought into contact with the workpiece at a predetermined position, and computer 60 is then triggered to sample the probe location at this point. Previously, the user would be required to toggle a separate "enter" key on the computer keyboard 135, or an "enter" button on a separate mouse. However, the computer interface device 56 according to this invention allows the user to activate a data entry button such as button 86 while, at all times, maintaining firm grip on probe holder 54.

Figure 5A:
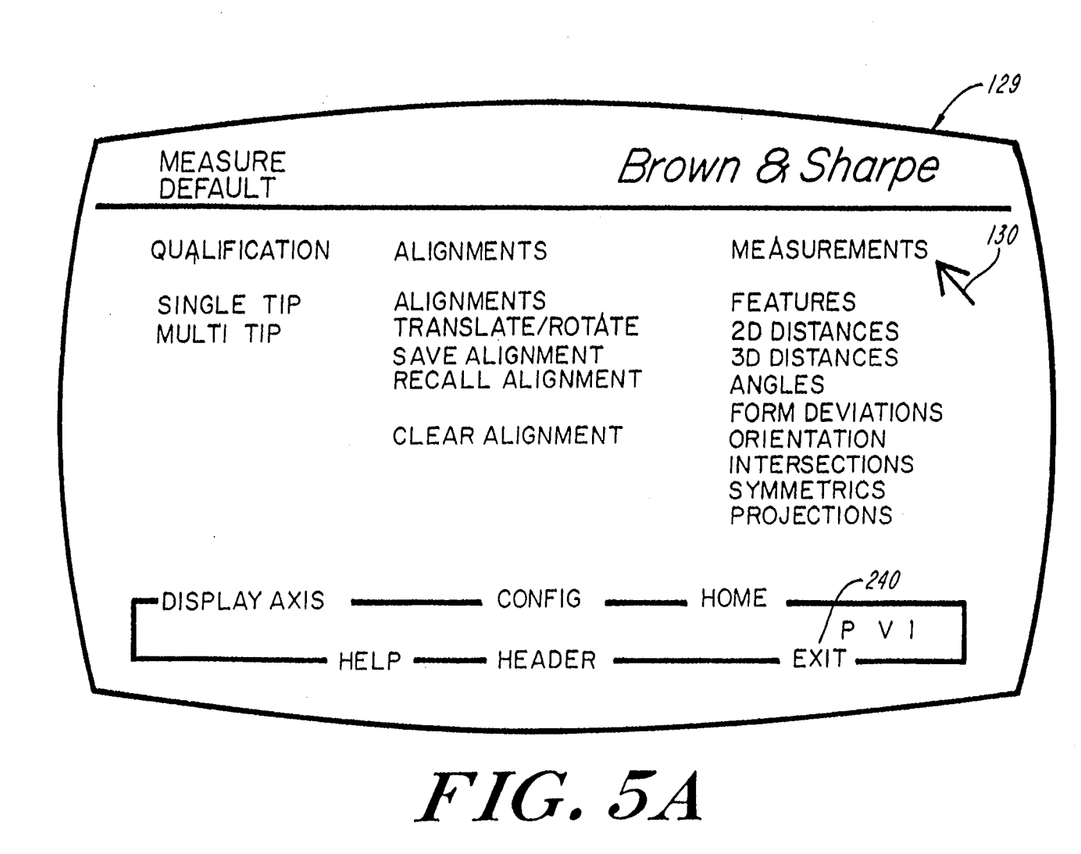
FIGS. 5A–5D show sample computer screen displays including menus for use with a measuring routine according this invention.

FIGS. 5A–5D depict computer screen menus commonly utilized with measurement procedures. In operation, a user typically selects from the variety of computer screen-provided menus and performs measurement functions based upon the choices presented in the menus. According to one example, the user selects a base function to be performed by the computer. FIG. 5A displays the available base functions. In this example, the cursor, as illustrated by arrow 130, is moved proximate the "measurements" function. Unlike the prior art in which the user moved cursor 130 using a keyboard, light pen, touch screen or mouse at the computer, cursor movement is accomplished by movement of trackball 78 of the interface device 56 on Z-axis 48 according to this invention. Cursor 130 follows the X- and Y-axis motion of trackball 78. Once the cursor is moved to the appropriate selection on screen 129, interface device pointer or "done" button 86 is pressed, entering the desired choice and instructing computer 60 to execute the chosen function.

Figure 5B:
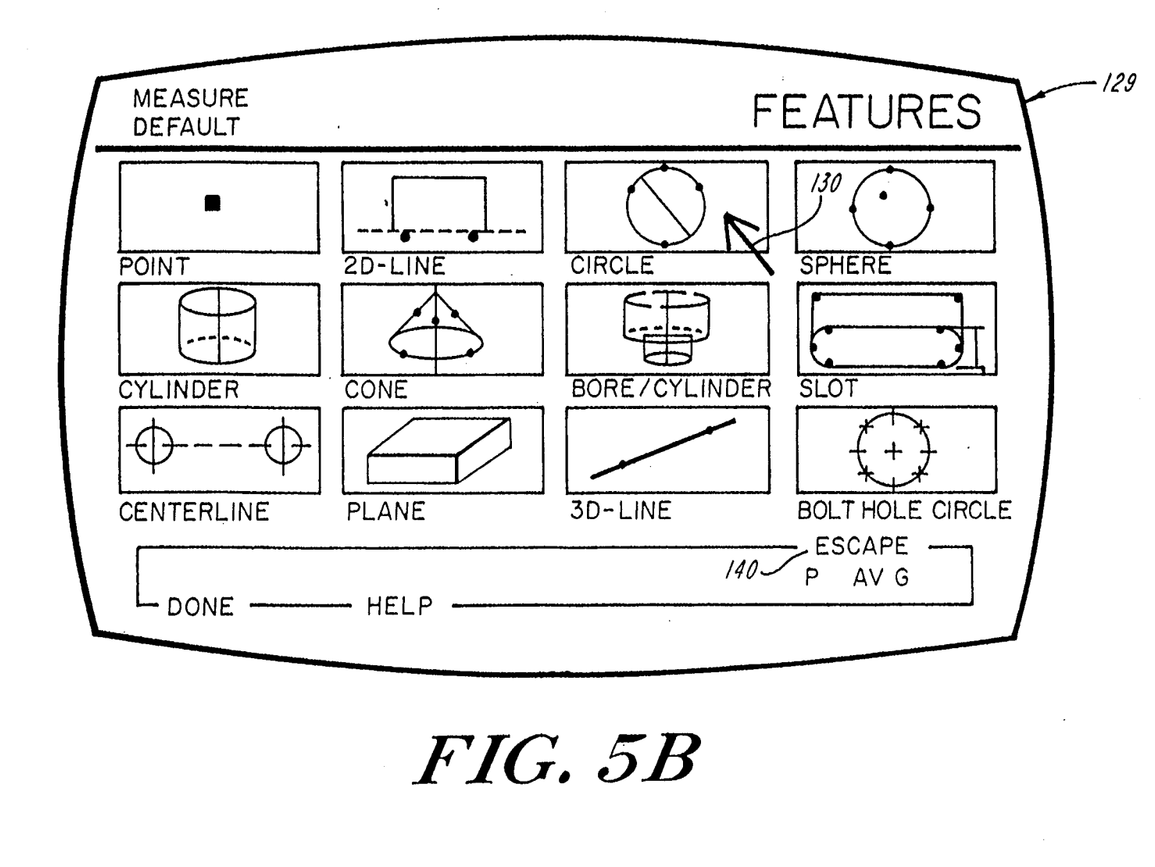

In response to the selection of measurements, screen 129 then displays a grouping of shapes commonly measured using the "measurement" function as shown in FIG. 5B. In this example, cursor 130 is moved to the "circle measurement" function. Upon activation of pointer or done button 86, computer 60 changes screen displays to that shown in FIG. 5C and awaits entry of points that allow the system to define a circle.

Figure 5C:
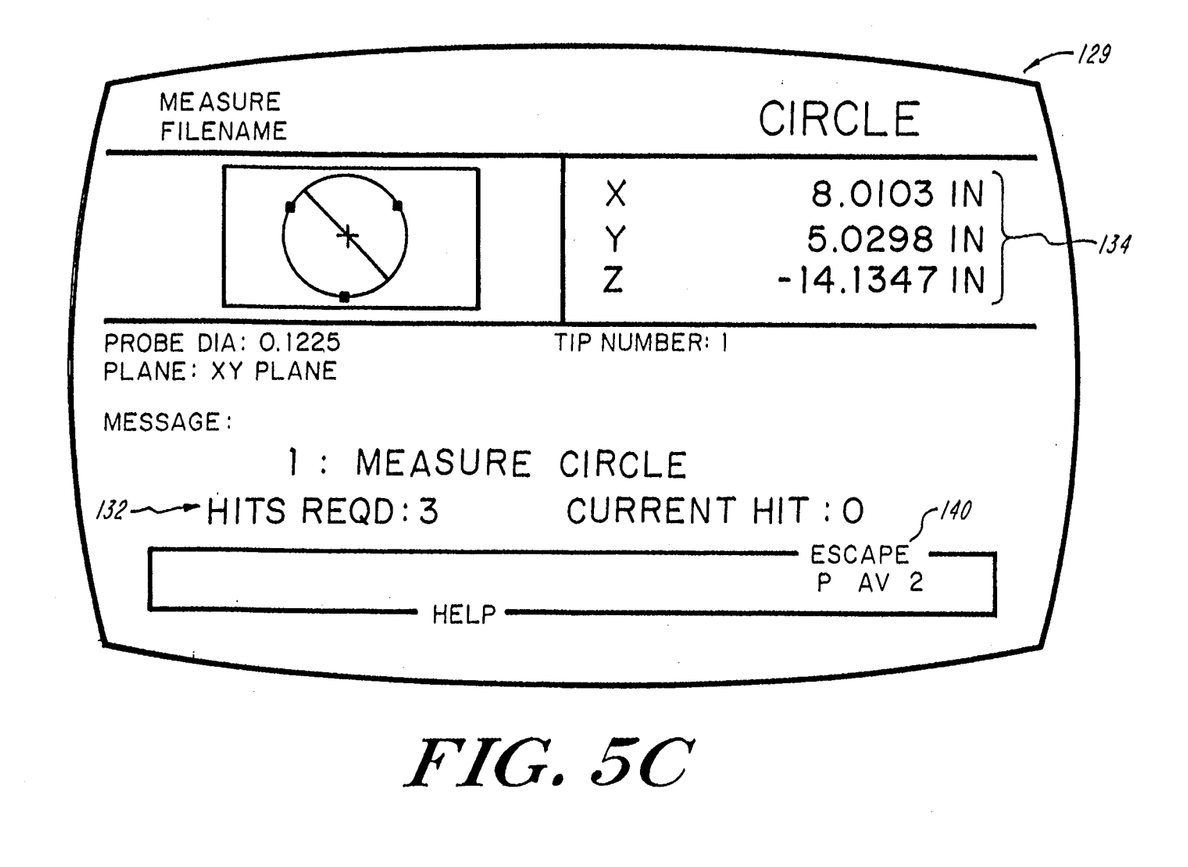

FIG. 5C displays a screen relating to the "circle measurement" function according to this example. At this time, the user, while grasping probe holder 54, moves it across the workpiece to collect points appropriate to measure a circle. As displayed in window 132, a minimum of three points are required. Typically, points along the edges of the circular workpiece at various locations about its circumference are contacted. If a touch trigger probe is utilized, contact of the probe with the workpiece causes direct entry of the current probe location points into the computer memory. Otherwise, entry via, for example, operation of pointer button 86 is required. As points are entered, they are displayed in absolute X-, Y- and Z-axis locations as shown in window 134.

Figure 5D:
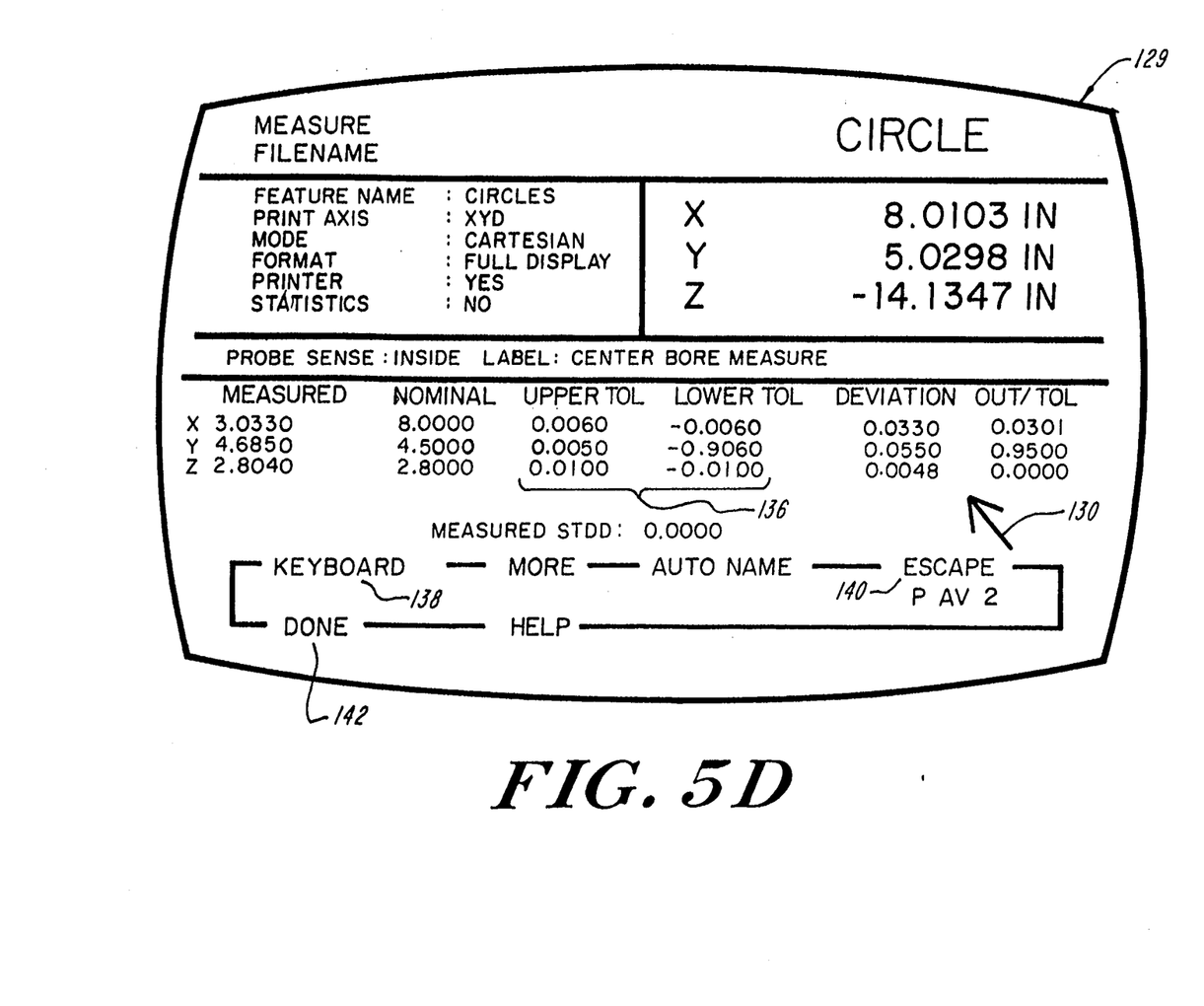

Once measurements are completed, the user presses done button 86 and computer 60 generates the screen display of FIG. 5D that presents the user with the measurement results. Computer 60 calculates the X, Y and Z coordinates of the center of the circle along with its diameter (D). By activating the "done" function 142 on screen 129, the main menu of FIG. 5A appears and then measurement cycle is then re-initiated. The user can use trackball 78 to manipulate data on screen 129 in order to accept, reject or modify measured points. Tolerances 136 can be entered, and a final result can be derived and stored without need for the user to release his or her grasp of probe holder 54. Note that, while not shown, a keyboard display can be provided to allow easier manipulation of alphanumeric characters on the displays. Such a keyboard display can be called by pointing cursor 130 to the appropriate menu command 138. Similarly, an "escape" function 140 can allow the user exit the menu or program at any time during operation. Such an "escape" function can be incorporated into interface device 56 via, for example, escape button 84.

After performing a set of measurements as outlined in FIGS. 5A–D, user can proceed to another set of measurements on the same workpiece or on another workpiece while continuing to grasp probe holder 54. Placing cursor 130 on "done" 142 returns the user to the main menu (FIG. 5A) for further measurements. To undertake continuous measurements while grasping probe holder 54, screen 129 of computer 60 need only remain within view of the user while he or she manipulates measuring machine 20.

FIG. 6 illustrates a basic computer procedure for controlling measurement functions utilizing interface device 56 according to this invention. The control procedure comprises a main loop that repeats continuously until it is terminated by the user. The system first initiates by initializing all variables and displaying the main menu (FIG. 5A) as illustrated in steps 200 and 202. Following initialization, the system enters the main loop 204 and calls a "Check_For_Keyboard_Input" 206. The Check_For_Keyboard_Input subroutine 208 reviews the DOS keyboard buffer for any inputs from the keyboard. It is noted that while a MicroSoft ® DOS operating system is utilized according to this embodiment, a variety of computer operating systems are contemplated and can be utilized. Similarly, while computer 60 comprises a microcomputer according to this embodiment, use of interface device 56 with a variety of data processing devices is contemplated.

The Check_For_Keyboard_Input subroutine 208 performs a reading of the DOS buffer for any keyboard entries and indicates such entries if made. The indicated entries are returned to the main loop. Any entries, if present, trigger a call command 210 to a Process_Keyboard_Input subroutine 212 that carries out a particular routine function based upon the input keyboard code. For example, pressing the "escape" key on the keyboard calls the "escape key processing" function.

The main loop next checks for an input of an X, Y and Z-axis value from measuring machine 20. Main loop step 214, thus, calls a Check_For_MicroVal_XYZ Input subroutine 216 that inputs any measured values into an appropriate buffer. Assuming an entered value for X-, Y- and Z-axis probe location is present (using, for example, a touch trigger probe signal to enter), the main loop initiates a call step 218 to a Process_MicroVal_XYZ_Input subroutine 220. The Process_MicroVal_XYZ_Input subroutine carries out a series of computations that, based upon the user's chosen procedure (i.e. circle, line etc.) provide a predetermined set of measurement values. The computer must have already been directed to execute a given procedure using, for example, done button 86 on the main menu. Hence, upon loop initiation, the computer usually loops at least once prior to entering the processing procedure to pick up any trackball entries.

The main loop then calls a Check_For_Trackball Input 222 in step 224. The Check_For_Trackball Input 222 scans an RS232 serial communication port (not shown) of computer 60 for any data transmitted from the interface device. Typically, interface device 56 according to this invention is connected to a serial port normally reserved for a mouse, light pen or other user interface device. The Check For_Trackball_Input subroutine 222 places any received-to-mouse data into a mouse buffer and then indicates that such data has been received. In the event such data has been received, the main loop calls a Process_Trackball_Input subroutine 226 in step 228. The Process_Trackball_Input subroutine 226 decodes the X and Y position of the trackball based upon the data stored on the mouse buffer. Upon any change in X and Y position, the screen cursor 130 moves from its current position to a new position upon screen 129. Movement involves a graphic drawing step (not shown).

The measurement control procedure, according to one embodiment of this invention, is normally designed to incorporate a light pen routine in which a light pen is moved about the screen 129 in order to effect data entry. Hence, the Process_Trackball Input subroutine 226 includes a Set LightPen ROW,COLUMN step 230 that translates the trackball X- and Y-axis position into a LightPen database position. Once the LightPen X- and Y-axis position is set via the mouse data, the subroutine 226 indicates that a "LightPen" input has been received. Process_Trackball_Input subroutine 226 then scans for operation of the "escape" and "point" (done) buttons 84 and 86, respectively on interface 56. If a point button signal is received, then the system translates the signal into a light pen switch closure signal in step 232 and indicates that a light pen switch closure input is received. Otherwise, the system defaults to a no entry or "FALSE" value for the LightPen in step 234. If, rather, the "escape" button is operated, then the DOS keyboard buffer is directed to enter an "escape" command, returning to the initial state 200 and 202 of the main loop as illustrated in step 236.

The loop continues until the "exit" function 240 on the main menu screen (FIG. 5A) is activated. At such time, the loop terminates as illustrated in step 242 (FIG. 6). It should be noted that the order of steps the main loop is not critical and computer 60 continues to loop continuously through the main loop until some form of input either via the measuring machine 20, the keyboard 135 or the interface device 56 according to this invention is entered. Given the appropriate input, the routine then calls appropriate data entry and processing functions that involve additional menus as shown in FIGS. 5B-5D as required.

It should be understood that the preceding is merely a detailed description of preferred embodiments. It should be apparent to those skilled in the art that various modifications and equivalents may be made without departing from the spirit or scope of the invention. For example, a joystick rather than a trackball can be utilized for the interface device. The preceding description, therefore, is meant to be taken only by way of example and to describe only preferred embodiments and not to otherwise limit the scope of the invention.

What is claimed is:

1. A coordinate measuring machine comprising:
    a probe;
    a control axis including a probe mounting location that supports the probe, the control axis being constructed and arranged so that the control axis is movable about a workpiece along each of a plurality of axes and wherein the control axis includes a gripping location that receives a gripping hand to manually move the control axis along each of the plurality of axes;
    a computer located remote from the control axis, for receiving measurement data corresponding to a location of the probe relative to each of the plurality of axes and for processing the data in response to predetermined commands input by the user, the computer having a display screen, remote from the control axis, that displays data and data processing functions based upon the measurement data and a prompt that is moveable about the display screen in each of a pair of transverse directions thereon to access and manipulate displayed data and data processing functions; and
    a manually-actuable computer interface device located on the control axis adjacent the gripping location, the computer interface being responsive to manipulation by a hand for inputting control signals to the computer, wherein the control signals manipulate the prompt about the display screen in each of the pair of transverse directions to enable processing of the data displayed on the display screen and the interface device is operable while the probe is located at a predetermined position relative to the workpiece.

2. A coordinate measuring machine as set forth in claim 1 wherein the interface device comprises a trackball interface that rotates selectively in each of tangential perpendicular X- and Y-axes to generate X and Y coordinate data values.

3. A coordinate measuring machine as set forth in claim 2 wherein the interface further comprises a data entry button for transmitting a discrete data signal to the computer upon operation thereof.

4. A coordinate measuring machine as set forth in claim 1 wherein the probe mounting location comprises a base and a housing enclosing at least a part of the base, the computer interface being mounted on the housing, the base including a mount for disconnection of the probe therefrom.

5. A coordinate measuring machine as set forth in claim 4 wherein the base further comprises a supplemental gripping surface on a side thereof substantially opposite the interface device.

6. A coordinate measuring machine as set forth in claim 5 wherein the supplemental gripping surface comprises a raised surface extending outwardly from the housing on the base.

7. A computer interface device for a coordinate measuring machine having a measuring probe supported on a control axis grippable and manipulable by a hand and movable in a plurality of axes over a predetermined range of movement about a workpiece and having a computer, located remote from the coordinate measuring machine, the computer being interconnected to the coordinate measuring machine for receiving measurement data representative of probe location from the coordinate measuring machine and having a display screen located remote from the control axis for displaying the measurement, the display screen including a displayed prompt that is movable about the display screen, the interface device comprising:
    a manual computer control switch that generates predetermined control signals, in response to manual manipulation of the manual computer control, positioned on the control axis, the predetermined control signals comprising discrete data signals generated in response to selective manipulation of the manual computer control by a hand, wherein the discrete data signals comprise screen display prompt movement signals that enable movement of the prompt in each of a pair of transverse directions to each of a plurality of locations on the computer display screen to enable identification of displayed data for processing of the measurement data; and at least one data entry button located on the control axis adjacent the manual computer control for generating a data processing signal in response to operation thereof, each of the manual computer control and the data entry button being interconnected with the computer by a remote control connection.

8. An interface device as set forth in claim 7 wherein the computer includes a serial port normally adapted to receive data from one of at least a mouse, a light pen, a touch screen and a joystick, the interface device being interconnected with the port.

9. An interface device as set forth in claim 8 wherein the coordinate measuring machine further includes a probe holder that supports the probe, the interface device being mounted on the probe holder.

10. An interface device as set forth in claim 9 wherein the interface device is mounted along one surface of the probe holder and further comprising a gripping surface positioned upon an opposing surface of the probe holder.

11. An interface device as set forth in claim 7 further comprising another data entry button for generating another data entry signal representative of a computer escape function.

12. An interface device as set forth in claim 7 further comprising a data cable interconnected between the interface device and the computer, the data cable being located within at least a portion of the interior of the coordinate measuring machine and exiting the coordinate measuring machine at a predetermined position.

13. An interface device as set forth in claim 7 wherein the computer includes a control procedure that processes the data representative of the probe location received from the coordinate measuring machine, the control procedure being operated by the interface device.

14. An interface device as set forth in claim 13 wherein the computer comprises an independent microcomputer that is interconnected to the coordinate measuring machine by a data conduit and wherein the control procedure generates menus on the display screen having predetermined functions thereon and the prompt comprises a cursor movable on the display screen to select the predetermined functions.

15. An interface device as set forth in claim 14 wherein the data entry button is operable to execute a predetermined function selected by the cursor.

16. An interface device as set forth in claim 7 wherein the control comprises a trackball that is rotatable about each of a pair of substantially transverse rotational axes to generate data signals corresponding to movement of the prompt in each of a pair of transverse directions to each of a plurality of locations on the display screen.

17. A method for performing measurements with a coordinate measuring machine comprising the steps of:

grasping a control axis of the coordinate measuring machine at a predetermined location with a gripping hand;

manipulating the control axis with the gripping hand to move a probe that is interconnected with and supported by the control axis about a workpiece to transmit measurement data representative of a location of the probe to a computer for storing and processing the measurement data;

displaying data based upon the measurement data on a remotely-positioned displayed screen of the computer; and operating with a hand a computer interface device located on the control axis while manipulating the control axis with the gripping hand, the step of operating including transmitting control data to the computer to move a prompt about the display screen, in each of a pair of transverse directions thereon, to instruct the computer to process the measurement data by identifying predetermined data displayed on the display screen.

18. A method as set forth in claim 17 wherein the step of operating the interface device includes rotating a trackball to transmit X- and Y-axis signals to the computer to move the prompt at each of a pair of corresponding perpendicular directions to locate the prompt relative to predetermined data on the display screen.

19. A method as set forth in claim 18 wherein the step of operating further comprises depressing a button located adjacent the computer interface device at predetermined times to transmit data entry commands to the computer while the prompt is located with respect to the predetermined data.

20. A method as set forth in claim 17 wherein the step of operating occurs while the probe is located in engagement with the workpiece.

21. A method as set forth in claim 20 wherein the step of manipulating the control axis includes touching the probe to the workpiece to generate a location signal and transmitting the location signal to the computer.

22. A method as set forth in claim 17 wherein the step of operating includes transmitting data to an independent microcomputer that is interconnected to the coordinate measuring machine through a data transmission conduit.

23. A coordinate measuring machine comprising:

a control axis, having a probe for engaging a workpiece mounted on the control axis and having a gripping surface for enabling a grasping hand to manipulate the control axis;

a plurality of rails for supporting the control axis, the rails constructed and arranged to enable movement of the control axis in each of a plurality of directions so that the probe is movable about the workpiece in response to manipulation of the grasping hand, the plurality of rails each including a position sensor for transmitting position data representative of a position of the control axis relative to each of the plurality of rails;

a computer, located remote from the control axis, for receiving the position data from each position sensor, the computer including a display, located remote from the control axis, for displaying data based upon the position data, the display including a cursor movable about the display in each of a pair transverse directions thereon for manipulating and processing displayed data;

a computer interface device comprising a manual computer interface, interconnected by a data conduit to the computer, the control switch being located on the control axis, the control switch constructed and arranged to enable movement of the cursor in each of the pair of transverse directions about the display in response to manipulation thereof by a hand; and at least one data entry button located adjacent the control switch for actuation by a hand wherein a predetermined data processing function of the computer is controlled relative to the displayed data identified by the cursor by actuation of the data entry button.

24. The coordinate measuring machine as set forth in claim 23 wherein the plurality of rails comprise at least three orthogonally-oriented rails that enable the control axis to move in at least three orthogonal directions.

25. The coordinate measuring machine as set forth in claim 23 wherein the manual computer interface comprises a trackball interface that generates a pair of movement signals for moving the cursor in each of a pair of transverse directions about the display in response to a corresponding tangential transverse movement of the trackball interface by a hand.

26. The coordinate measuring machine as set forth in claim 25 wherein the control axis includes a mounting base having the probe mounted thereon, the trackball interface being mounted on the mounting base and the mounting base including a change lever for removing the probe therefrom.

* * * * *